(12) United States Patent
Mizoguchi

(10) Patent No.: US 12,535,826 B2
(45) Date of Patent: Jan. 27, 2026

(54) SERVER APPARATUS FOR REMOTE TRAVEL CONTROL OF VEHICLE

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 112 days.

(21) Appl. No.: 18/598,860

(22) Filed: Mar. 7, 2024

(65) Prior Publication Data

US 2024/0310843 A1    Sep. 19, 2024

(30) Foreign Application Priority Data

Mar. 16, 2023   (JP) .................................. 2023-041740

(51) Int. Cl.
| | |
|---|---|
| G05D 1/224 | (2024.01) |
| G05D 1/246 | (2024.01) |
| G06V 20/56 | (2022.01) |
| G05D 109/10 | (2024.01) |
| G05D 111/10 | (2024.01) |

(52) U.S. Cl.
CPC ........... *G05D 1/2247* (2024.01); *G05D 1/246* (2024.01); *G06V 20/588* (2022.01); *G05D 2109/10* (2024.01); *G05D 2111/10* (2024.01)

(58) Field of Classification Search
CPC .. G05D 1/2247; G05D 1/246; G05D 2109/10; G05D 2111/10; G05D 1/225; G05D 2105/22; G05D 2107/13; G05D 1/243; G06V 20/588; B60W 30/18154; B60W 2420/403; B60W 2556/45; B60W 2556/55

See application file for complete search history.

(56) References Cited

U.S. PATENT DOCUMENTS

2019/0086215 A1 * 3/2019 Ming-Xuan et al. ........................ G01C 21/165
2019/0265727 A1   8/2019 Suzuki et al.
(Continued)

FOREIGN PATENT DOCUMENTS

| | | | |
|---|---|---|---|
| JP | 2019-148850 A | 9/2019 | |
| JP | WO2023008307 | * 2/2023 | ............. G01C 21/32 |
| WO | 2018/092298 A1 | 5/2018 | |

*Primary Examiner* — Brodie J Follman
(74) *Attorney, Agent, or Firm* — Rimon P.C.

(57) ABSTRACT

A server apparatus includes a communicator and a remote processor. The communicator receives position data of a vehicle traveling on a road. The remote processor generates travel control data, based on the received position data and transmits the travel control data. The remote processor executes a stop line process and a correction data generation process. The stop line process generates travel control data that is adapted to stop the vehicle at a position where a stop line on the road is capturable by a vehicle-mounted camera after the vehicle is stopped. The correction data generation process generates, based on a captured position of the stop line in the image captured by the vehicle-mounted camera after the vehicle is stopped, correction data that is adapted to correct a vehicle position. The remote processor corrects the vehicle position data received by the communicator and generates the travel control data for the vehicle.

11 Claims, 8 Drawing Sheets

(56) References Cited

U.S. PATENT DOCUMENTS

2019/0329765 A1 10/2019 Hanayama et al.
2020/0114917 A1* 4/2020 Oguro et al. ....... B60W 30/181

* cited by examiner

SERVER APPARATUS FOR REMOTE TRAVEL CONTROL OF VEHICLE

CROSS-REFERENCE TO RELATED APPLICATIONS

The present application claims priority from Japanese Patent Application No. 2023-041740 filed on Mar. 16, 2023, the entire contents of which are hereby incorporated by reference.

BACKGROUND

The disclosure relates to a server apparatus for a remote travel control of a vehicle.

Research and development has progressed for vehicles such as automobiles in controlling traveling of a vehicle by assisting a driving operation performed by a driver who drives the vehicle and in controlling traveling by automated driving. For example, reference is made to Japanese Unexamined Patent Application Publication (JP-A) No. 2019-148850 and Japanese Unexamined Patent Application Publication (Translation of PCT Application) No. 2018-092298.

In this case, the vehicle basically generates a control value in accordance with a driving operation of the driver or a control value in accordance with the automated driving and controls operation of devices such as a drive device, based on the control values.

SUMMARY

An aspect of the disclosure provides a server apparatus for a remote travel control of a vehicle. The server apparatus includes a communicator and a remote processor. The communicator is configured to communicate with the vehicle that is adapted to capture an image of a course of the vehicle by a vehicle-mounted camera while the vehicle is traveling on a road, and receive position data of the vehicle. The remote processor is configured to generate travel control data that is usable by the vehicle for a travel control, based on the position data of the vehicle received by the communicator, and transmit the generated travel control data from the communicator to the vehicle. The remote processor is configured to: execute a stop line process including generating travel control data that is adapted to stop the vehicle at a position where a stop line on the road is capturable by the vehicle-mounted camera of the vehicle after the vehicle is stopped; execute a correction data generation process including generating, based on a captured position of the stop line in the image captured by the vehicle-mounted camera of the vehicle after the vehicle is stopped, correction data that is adapted to correct a position of the vehicle based on a distance from the position of the vehicle after the vehicle is stopped to the stop line; correct, after generating the correction data, the position data of the vehicle received by the communicator, based on the correction data; and generate the travel control data for the vehicle, based on the corrected position data of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
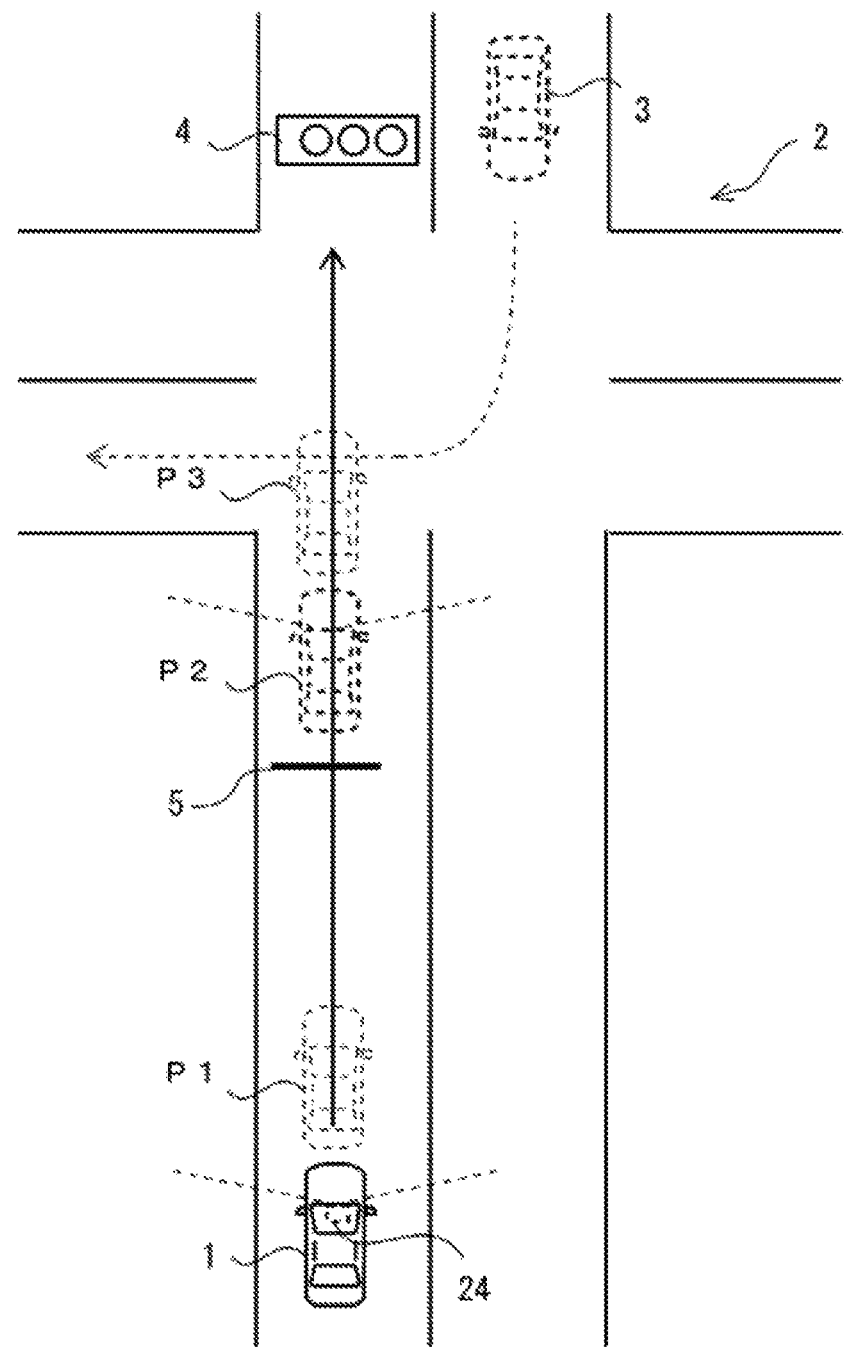
FIG. 1 is an explanatory diagram illustrating an example of a state where a vehicle that is adapted to travel by a remote travel control is traveling toward an intersection.

A travel control of a vehicle may be executed by a server apparatus as in, for example, JP-A No. 2006-151014. For example, the vehicle detects a position of itself and transmits the detected position to the server apparatus. The vehicle may also be referred to as an "own vehicle". The server apparatus generates travel control data such as control values, based on data acquired from, for example, the vehicle and transmits the generated travel control data to the vehicle. The vehicle controls the traveling of the own vehicle, based on the travel control data such as control values received from the server apparatus.

In remotely controlling the traveling of the vehicle by the server apparatus as described above, the position of the vehicle transmitted to the server apparatus by the vehicle is to be highly accurate. When the accuracy of the position of the vehicle is low, the server apparatus is to widely estimate an existence range of the position of the vehicle and generate the travel control data so as not to interfere with, for example, other vehicles under the estimation.

However, the accuracy of the position of the vehicle transmitted by the vehicle to the server apparatus is sometimes not high. For example, when a position detector provided on the vehicle is not an advanced global navigation satellite system (GNSS) receiver, the position generated by the position detector may possibly have a positional error of few meters to several tens of meters. Additionally, when the GNSS receiver or such a device is unable to receive electric waves from satellites, the position detector is to calculate the position, based on detection data of in-vehicle sensors including, for example, a vehicle speed sensor, a wheel speed sensor, and a steering angle sensor provided in the own vehicle. The accuracy of the position estimated by such calculation may possibly decrease depending on, for example, a distance to be calculated.

For one reason described above, even if the server apparatus receives position data from the vehicle, there is a possibility that it is difficult to assume that the position of the vehicle traveling on a road is accurately grasped. As a result, the server apparatus is to widen a possible existence range of the vehicle to remotely control the traveling of the vehicle.

For example, when the vehicle is traveling toward an intersection where an oncoming vehicle is turning right, in order to help prevent interference between the vehicle and the oncoming vehicle that is turning right, the server apparatus is to acquire a longer range of a time period or a distance during which the vehicle may possibly pass through the intersection and interfere with the oncoming vehicle, and generate travel control data for the vehicle under this condition.

It is desirable to provide an improved server apparatus for a remote travel control of a vehicle. In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 is an explanatory diagram illustrating an example of a state where a vehicle 1 that is adapted to travel by a remote travel control is traveling toward an intersection 2.

The vehicle 1 illustrated in FIG. 1 may be, for example, an automobile. Additionally, the vehicle 1 may include, for example, a truck, a bus, a motorcycle, and a personal mobility vehicle. The vehicle 1 may also be referred to as an "own vehicle". In one embodiment, the vehicle 1 may serve as a "vehicle".

In FIG. 1, the vehicle 1 may be traveling in a lane of a road toward the intersection 2.

At the intersection 2, a traffic light 4 may illuminate blue indicating that the vehicle 1 is allowed to pass, and an oncoming vehicle 3 may be intending to turn right.

Figure 2:
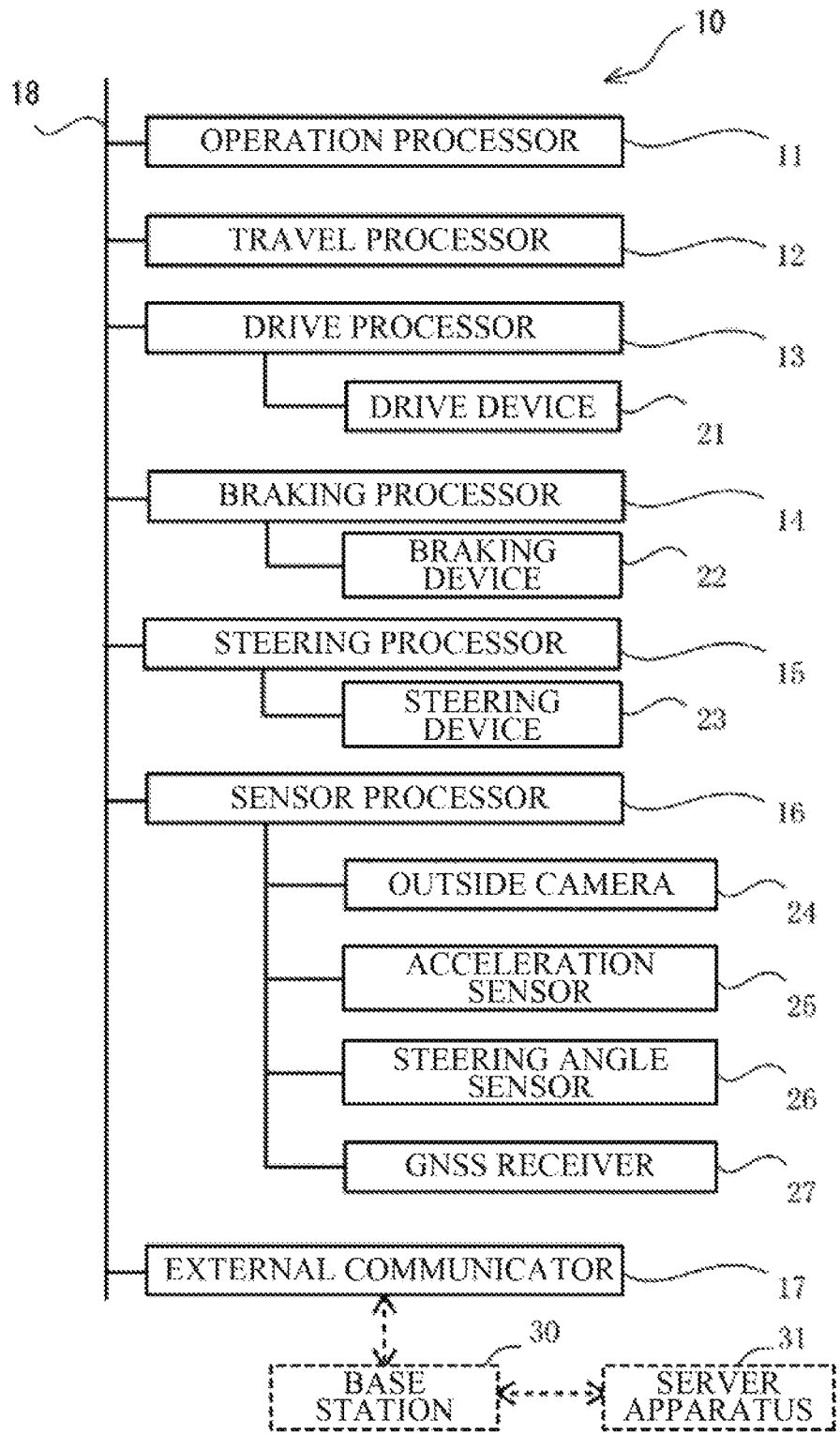
FIG. 2 is an explanatory diagram illustrating a control system of the vehicle provided on the vehicle illustrated in FIG. 1.

In this case, the vehicle 1 is to pass through the intersection 2 so as not to interfere with the oncoming vehicle 3 that is intending to turn right. In one embodiment, the intersection 2 may serve as an "intersection". In one embodiment, the traffic light 4 may serve as a "traffic light". FIG. 2 is an explanatory diagram illustrating a control system 10 of the vehicle 1. The control system 10 may be provided on the vehicle 1 illustrated in FIG. 1.

The control system 10 of FIG. 2 may include multiple processors and a vehicle network 18 to which the processors are coupled. The vehicle network 18 may be compliant with a standard such as a controller area network (CAN) or a local interconnect network (LIN). It is possible for the processors to transmit and receive data to and from each other through the vehicle network 18. FIG. 2 illustrates, as examples of the processors, an operation processor 11, a travel processor 12, a drive processor 13, a braking processor 14, a steering processor 15, a sensor processor 16, and an external communicator 17. The control system 10 may include other processors.

Various operation members to be operated by an occupant in the vehicle 1 may be coupled to the operation processor 11. The operation members to be operated by the occupant may be provided in the vehicle 1 to control the traveling of the vehicle 1. Examples of such operation members may include a steering wheel, an accelerator pedal, a brake pedal, and a shift lever, which are not illustrated. The operation processor 11 may acquire an operation input of the occupant to each of the operation members and output operation data to other processors through the vehicle network 18.

A drive device 21 that accelerates the vehicle 1 may be coupled to the drive processor 13. The drive device 21 may include, for example, an engine, a motor, and a transmission. The drive processor 13 may acquire control data regarding driving provided from the vehicle network 18 and control operation of the drive device 21. This makes it possible for the vehicle 1 to accelerate or maintain a speed.

A braking device 22 that decelerates and ultimately stops the vehicle 1 may be coupled to the braking processor 14. The braking device 22 may include, for example, a brake that reduces rotation of wheels of the vehicle 1 and a regenerative device that causes the drive device 21 to perform a regenerative operation. The braking processor 14 may acquire control data regarding braking from the vehicle network 18 and control operation of the braking device 22. This makes it possible for the vehicle 1 to decelerate or stop.

A steering device 23 may be coupled to the steering processor 15. The steering device 23 may include an actuator that varies a direction of a steered wheel of the vehicle 1. The steering processor 15 may acquire control data regarding steering from the vehicle network 18 and control operation of the steering device 23. This may switch an advancing direction of the vehicle 1 to a straight ahead direction, a right direction, or a left direction.

Various in-vehicle sensors provided in the vehicle 1 may be coupled to the sensor processor 16. Here, an outside camera 24, an acceleration sensor 25, a steering angle sensor 26, and a global navigation satellite system (GNSS) receiver 27 are illustrated as examples of the in-vehicle sensors. In addition to the above, for example, outside light detection and ranging (Lidar) that scans an outside of the vehicle and generates space data of the outside of the vehicle may be coupled to the sensor processor 16. The space data may replace or interpolate vehicle outside images captured by the outside camera 24.

The outside camera 24 may capture an image of surrounding of the vehicle 1 including a region in front of the vehicle 1. The outside camera 24 may include, for example, a monocular camera, a stereo camera, or a 360-degree Camera. The outside camera 24 may capture an image of the region in front of the vehicle 1 in a wide angle as indicated by broken lines in FIG. 1. In this case, the image captured by the outside camera 24 may include image components of the intersection 2, the traffic light 4, a stop line 5, and the oncoming vehicle 3, which are located in front of the vehicle 1. In one embodiment, the outside camera 24 may serve as a "vehicle-mounted camera". In one embodiment, the stop line 5 may serve as a "stop line".

The acceleration sensor 25 may detect an acceleration rate of the vehicle 1 that is traveling. The acceleration sensor 25 may detect the acceleration rate in directions of three orthogonal axes.

The steering angle sensor 26 may detect a steering angle of the steered wheel of the vehicle 1. The steering angle of the steered wheel of the vehicle 1 may correspond to the advancing direction of the vehicle 1.

The GNSS receiver 27 may receive electric waves from GNSS satellites and generate data regarding a current position of the vehicle 1 and a current time.

The sensor processor 16 may acquire detection data from various in-vehicle sensors provided in the vehicle 1 and output the detection data to other processors through the vehicle network 18. The sensor processor 16 may process the detection data from the in-vehicle sensors and output a result of processing as the detection data to other processors through the vehicle network 18. For example, the sensor processor 16 may generate data on a magnitude of a speed and a direction of traveling of the vehicle 1 and data regarding yaw, pitch, and roll indicating a behavior of the vehicle 1, based on the acceleration rate detected by the acceleration sensor 25. The sensor processor 16 may output the generated detection data to other processors through the vehicle network 18. This makes it possible for the sensor processor 16 to output, for example, data on a traveling state including the current position of the vehicle 1 to other processors through the vehicle network 18. The sensor processor 16 may serve as a position detector.

Further, the sensor processor 16 may analyze a vehicle outside image taken by the outside camera 24 provided on the vehicle 1 to capture an image of the outside of the vehicle 1. The sensor processor 16 may generate various kinds of data including, for example, the intersection 2, the traffic light 4, the stop line 5, and the oncoming vehicle 3 illustrated in FIG. 1. The sensor processor 16 may output the generated detection data to other processors through the vehicle network 18. This makes it possible for the sensor processor 16 to output, for example, data on a remaining distance to the intersection 2, a lighting state of the traffic light 4, a remaining distance to the stop line 5, which is a stop position of the intersection 2, and a timing at which the oncoming vehicle 3 passes through the intersection 2 to other processors through the vehicle network 18.

The external communicator 17 may establish a wireless communication path with a base station 30 outside the vehicle 1. The external communicator 17 may transmit and receive data to and from a server apparatus 31 using the established wireless communication path. The server apparatus 31 may be for the remote travel control of, for example, the vehicle 1.

The external communicator 17 may transmit, for example, the detection data of the own vehicle to the server apparatus 31 for the remote travel control of the vehicle 1, and receive, from the server apparatus 31, travel control data that is usable to control the traveling of the own vehicle.

The travel processor 12 may basically generate a control value that is used to cause the vehicle 1 to travel in accordance with travel control data generated by the own vehicle, and output the generated control value to the drive processor 13, the braking processor 14, and the steering processor 15.

In this case, the travel processor 12 may generate a control value in accordance with operation of each of the operation members performed by a driver who drives the vehicle 1, generate a control value that assists a driving operation of the driver, or generate a control value for automated driving that does not depend on operation performed by the driver.

The automated driving is classified into levels 1 to 5. For example, the automated driving of level 1 assists a driving operation performed by a driver who drives a vehicle. The automated driving of level 5 is referred to as fully automated driving and causes the vehicle 1 to travel without operation performed by the driver who drives the vehicle 1. Many manufacturers at the present stage develop commercial vehicles adaptable to level 2 and level 3.

For example, the travel processor 12 adaptable to level 2 or higher basically performs a combination of multiple travel controls including, for example, a preceding vehicle following control, a lane keep control, and an interference avoidance control to generate control values to be outputted to the drive processor 13, the braking processor 14, or the steering processor 15.

The lane keep control may generate and output, for example, a control value for the steering device 23 to keep the vehicle 1 within the lane of the road in which the vehicle 1 is traveling.

The preceding vehicle following control may generate and output a control value for the drive device 21 to cause the vehicle 1 to follow a preceding vehicle that is traveling in front of the vehicle 1 while keeping an inter-vehicle distance corresponding to a vehicle speed between the vehicle 1 and the preceding vehicle. When the vehicle 1 comes close to the preceding vehicle, the travel processor 12 may generate a control value for the braking device 22 to decelerate the own vehicle in accordance with a speed of the preceding vehicle. When the preceding vehicle stops, the travel processor 12 may generate a control value for the braking device 22 to stop the own vehicle behind the preceding vehicle. Note that, when there is no preceding vehicle close to the vehicle 1 in the lane of the road in which the vehicle 1 is traveling, the travel processor 12 may basically generate and output a control value for the drive device 21 to cause the vehicle 1 to travel at a speed limit of the road. The travel processor 12 that performs the preceding vehicle following control may be sometimes incorporated in the vehicle 1 as, for example, an adaptive cruise control (ACC).

The interference avoidance control may generate and output a control value for the braking device 22 to help prevent interference of the vehicle 1 with an obstacle if there is an obstacle or if it predicted that there will be an obstacle on a course on which the vehicle 1 is traveling. The obstacle may include, for example, a preceding vehicle, the oncoming vehicle 3, a pedestrian, a cyclist, and a curb. The travel processor 12 may predict presence or absence of an obstacle and possibility of interference between the vehicle 1 and the obstacle on the course by, for example, analyzing the vehicle outside image captured by the outside camera 24 mounted on the vehicle 1. If the interference with the obstacle is predicted, the travel processor 12 may generate a control value for the braking device 22 to avoid or help prevent the interference.

With such autonomous and automated driving control, it is possible for the travel processor 12 to cause the vehicle 1 to smoothly travel while ensuring safety on the road including the intersection 2 having the traffic light 4, based on the vehicle outside image captured by the outside camera 24 mounted on the vehicle 1.

Further, when the travel control data is received from the server apparatus 31, the travel processor 12 of the example embodiment may generate control values to be outputted to the drive processor 13, the braking processor 14, and the steering processor 15 to execute the remote travel control by the server apparatus 31 and cause the vehicle 1 to travel under a remote control of the server apparatus 31 instead of the autonomous control performed by the own vehicle as described above.

When the travel control data that is receivable and acquirable from the server apparatus 31 is a control value that is outputtable to the drive processor 13, the braking processor 14, or the steering processor 15, the travel processor 12 may output the acquired control value to the drive processor 13, the braking processor 14, or the steering processor 15 as it is. Further, the travel processor 12 may adjust the control value acquired from the server apparatus 31 in accordance with own vehicle's data, and output the adjusted control value to the drive processor 13, the braking processor 14, or the steering processor 15. This makes it possible for the server apparatus 31 to perform remote traffic control on the traveling of the vehicle 1.

When the travel control data receivable and acquirable from the server apparatus 31 is, for example, data on a travelable range or a recommended course used to generate a control value, the travel processor 12 may generate a control value to be outputted to the drive processor 13, the braking processor 14, or the steering processor 15, based on a combination of the own vehicle's data and the travel control data from the server apparatus 31. This makes it possible for the server apparatus 31 to remotely assist and control the traveling of the vehicle 1.

As a result, it is possible for the vehicle 1 to smoothly travel while ensuring safety on the road including the intersection 2 having the traffic light 4 similarly to a case where the vehicle 1 travels by autonomous and automated driving, even under the remote control performed by the server apparatus 31.

Figure 3:
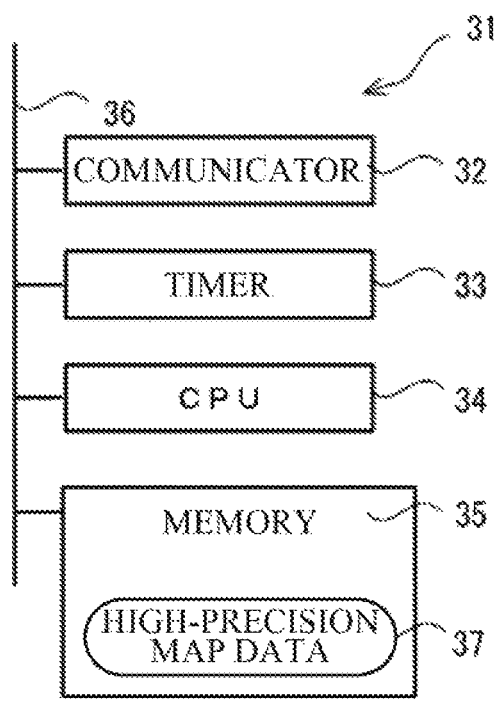
FIG. 3 is a configuration diagram illustrating a basic configuration of a server apparatus for the remote travel control of a vehicle according to one example embodiment of the disclosure.

FIG. 3 is a configuration diagram illustrating a basic configuration of the server apparatus 31 for the remote travel control of the vehicle 1 according to the example embodiment of the disclosure.

The server apparatus 31 illustrated in FIG. 3 may include a communicator 32, a timer 33, a memory 35, a central processing unit (CPU) 34, and a server bus 36 to which these components are coupled.

The communicator 32 may be coupled to a communication network such as the Internet or a carrier network. The communicator 32 may transmit and receive data to and from the external communicator 17 of the vehicle 1 traveling on the road through, for example, the base station 30 coupled to the communication network as illustrated in FIG. 1. In one embodiment, the communicator 32 may serve as a "communicator".

For example, the communicator 32 is configured to communicate with the vehicle 1 that is adapted to capture an image of the course by a vehicle-mounted camera while traveling on the road, and receive position data of the vehicle 1.

The timer 33 may measure a time or a time period.

The memory 35 may store programs to be executed by the CPU 34 and data. FIG. 3 illustrates high-precision map data 37 as an example of the data stored in the memory 35. The high-precision map data 37 may include data including, for example, a structure of the lane of the road and other elements in reality, a structure of the intersection 2, presence or absence of the traffic light 4, and a position of the stop line 5, which are for use in the automated driving of the vehicle 1. As a result, it is possible for the memory 35 to store the high-precision map data 37 including the position data of the stop line 5 at the intersection 2 as the high-precision map data 37 for the road on which the vehicle 1 travels. The memory 35 may include, for example, a non-volatile semiconductor memory, a hard disk drive (HDD), and a random access memory (RAM). In one embodiment, the memory 35 may serve as a "memory".

The CPU 34 may read and execute the programs stored in the memory 35. This may implement a remote processor 38 in the server apparatus 31. The remote processor 38 may remotely control the traveling of the vehicle 1 as will be described later with reference to FIG. 4. The CPU 34 may manage the operation of the server apparatus 31.

For example, the CPU 34, serving as the remote processor 38, is configured to generate the travel control data that is usable by the vehicle 1 for the travel control, based on the position data of the vehicle 1 received by the communicator 32, and transmit the generated travel control data from the communicator 32 to the vehicle 1. In one embodiment, the remote processor 38 or the CPU 34 may serve as a "remote processor".

Figure 4:
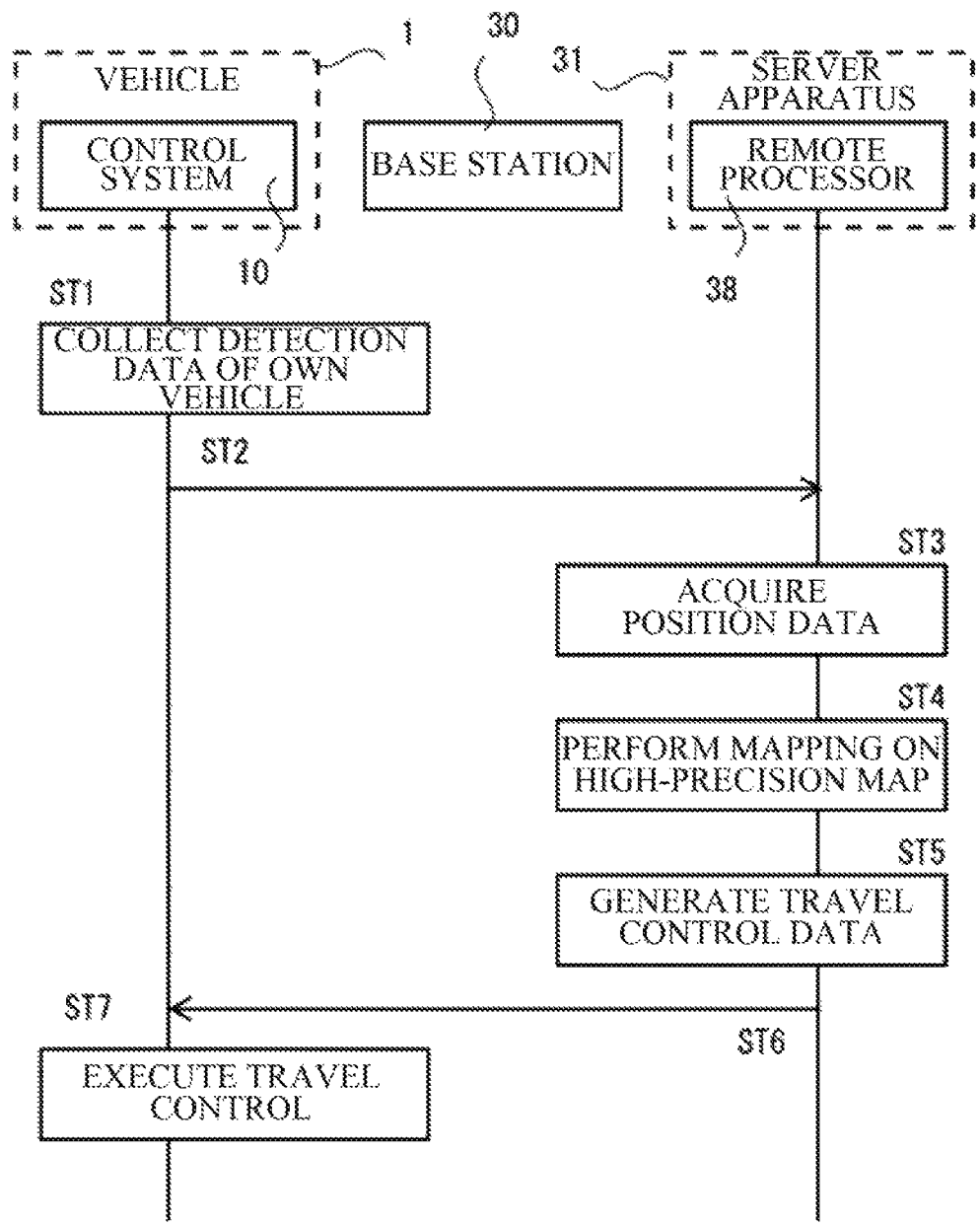
FIG. 4 is a timing chart illustrating the remote travel control of the vehicle performed by the server apparatus illustrated in FIG. 3.

FIG. 4 is a timing chart illustrating the remote travel control of the vehicle 1 performed by the server apparatus 31 illustrated in FIG. 3.

FIG. 4 illustrates the control system 10 of the vehicle 1, the base station 30, and the remote processor 38 implemented in the CPU 34 of the server apparatus 31. In FIG. 4, time flows from top to bottom.

In step ST1, for example, the travel processor 12 of the control system 10 of the vehicle 1 may collect the detection data of the own vehicle. The detection data may include data outputted from, for example, the sensor processor 16. The data may include, for example, the position data of the vehicle 1, accuracy data of the position, the advancing direction and the speed of the vehicle 1, the image captured by the outside camera 24 mounted on the vehicle 1, and the data on the traveling state of the vehicle 1 traveling under the control of the server apparatus 31.

In step ST2, for example, the travel processor 12 of the control system 10 of the vehicle 1 may transmit the collected detection data of the own vehicle to the server apparatus 31. The detection data may be transmitted from the external communicator 17 of the vehicle 1 to the communicator 32 of the server apparatus 31 via the base station 30. The server apparatus 31 may store the data received from the vehicle 1 in the memory 35.

In step ST3, the remote processor 38 of the server apparatus 31 may acquire data such as the position data of the vehicle 1 from the detection data of the vehicle 1 received by the communicator 32.

In step ST4, the remote processor 38 of the server apparatus 31 may perform mapping of the vehicle 1 to a position corresponding to the acquired position data on a high-precision map based on the high-precision map data 37. As a result, the position of the vehicle 1 may be mapped to the high-precision map data 37 for the road on which the vehicle 1 travels. The remote processor 38 may further perform mapping of data on the lighting state of the traffic light included in the high-precision map data 37 to the high-precision map.

In step ST5, the remote processor 38 of the server apparatus 31 may generate the travel control data for the vehicle 1 to safely travel, based on the high-precision map to which the vehicle 1 is mapped. The remote processor 38 may generate the travel control data for the vehicle 1, based on a virtual travel environment generated in the mapping to correspond to the reality.

In step ST6, the remote processor 38 of the server apparatus 31 may transmit the generated travel control data to the vehicle 1. The travel control data may be transmitted from the communicator 32 of the server apparatus 31 to the external communicator 17 of the vehicle 1 via the base station 30.

In step ST7, for example, the travel processor 12 of the control system 10 of the vehicle 1 may execute a travel control process for the vehicle 1, based on the travel control data received from the server apparatus 31.

In the remote travel control of the vehicle 1 performed by the server apparatus 31 described above, the position of the vehicle 1 transmitted to the server apparatus 31 by the vehicle 1 is to be highly accurate. When the accuracy of the position of the vehicle 1 is low, the server apparatus 31 is to widely estimate an existence range of the position where a possibility of an existence of the vehicle 1 is assumed and generate the travel control data so as not to interfere with, for example, other vehicles 1 under the estimation.

However, the accuracy of the position of the vehicle 1 transmitted by the vehicle 1 to the server apparatus 31 may be sometimes not high.

For example, when the GNSS receiver 27 provided on the vehicle 1 is not an advanced GNSS receiver, the position generated by the vehicle 1 may possibly have a positional error of few meters to several tens of meters.

Additionally, when the GNSS receiver 27 or such a device is unable to receive electric waves from satellites, the sensor processor 16, which serves as the position detector, is to calculate the position, based on the detection data of the in-vehicle sensors including, for example, a vehicle speed sensor, a wheel speed sensor, and the steering angle sensor 26 provided in the own vehicle. The accuracy of the position generated by such calculation may possibly decrease depending on, for example, a distance to be calculated.

For one reason described above, even if the server apparatus 31 receives the position data from the vehicle 1, there is a possibility that it is difficult to assume that the position of the vehicle 1 traveling on the road is accurately grasped. As a result, the server apparatus 31 is to widen a possible existence range of the vehicle 1 and remotely control the traveling of the vehicle 1 under the widened possible existence range.

For example, when the accuracy of the position data of the vehicle 1 indicated by the solid line in FIG. 1 is not high, the remote processor 38 of the server apparatus 31 is to generate the travel control data for the vehicle 1 in consideration of the possibility that the vehicle 1 exists at a position P1. In this case, when the travel control data is generated to move the vehicle 1 illustrated by the solid line in FIG. 1 to a position P2 in FIG. 1, the remote processor 38 of the server apparatus 31 is to generate the travel control data for the vehicle 1 in consideration of the possibility that the vehicle 1 exists at a position P3 after the movement. If the vehicle 1 after the movement is actually located at the position P3, the vehicle 1 may possibly interfere with the oncoming vehicle 3 that is intending to turn right at the intersection 2.

As described above, when a positional deviation is great between an actual position of the vehicle 1 and the position in the data, it is difficult for the remote processor 38 of the server apparatus 31 to safely and smoothly move the vehicle 1 compared with the case where there is no such positional deviation.

As described above, the server apparatus 31 for the remote travel control of the vehicle 1 is to be improved.

Figure 5:
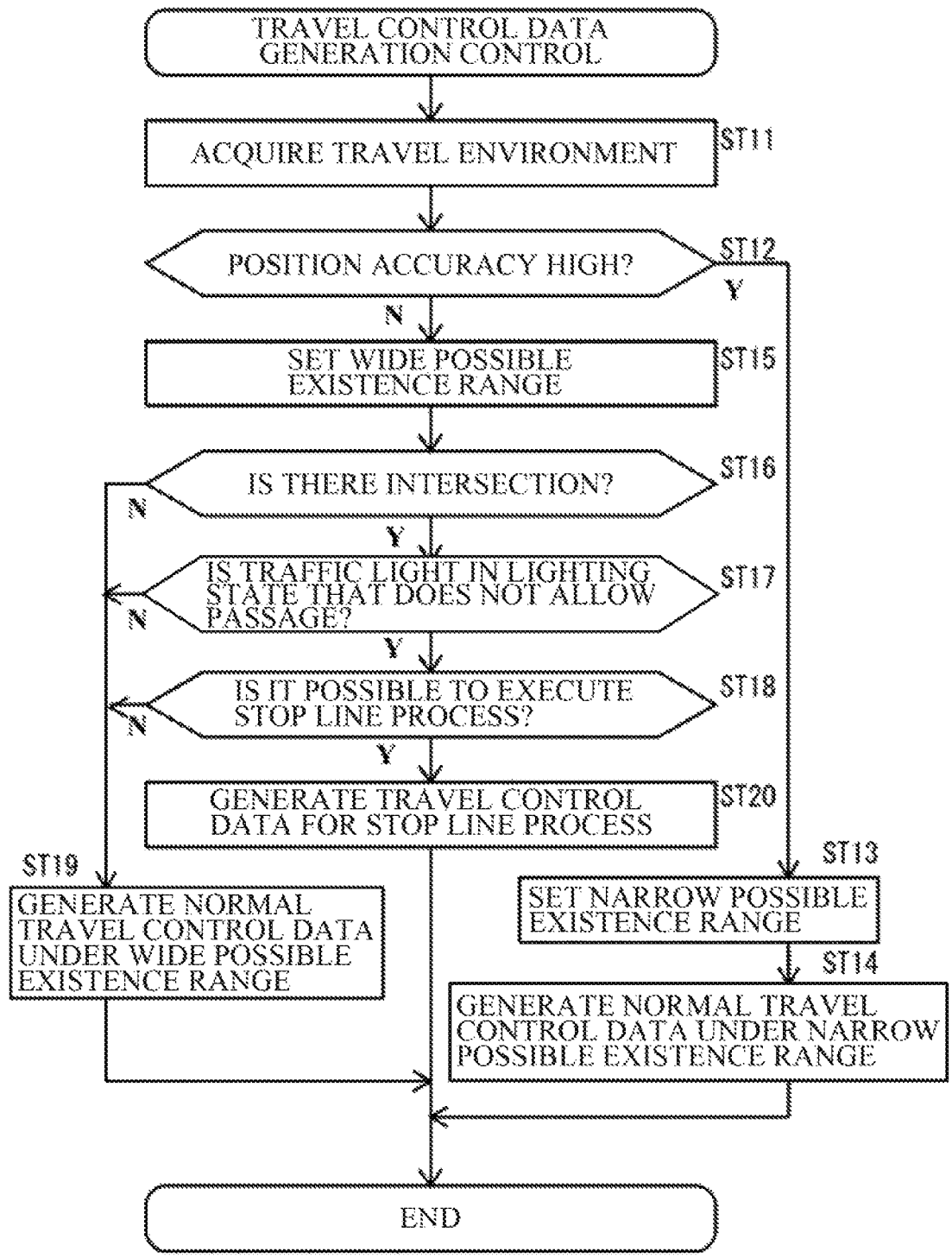
FIG. 5 is a flowchart of a travel control data generation control executed by a central processing unit (CPU) of the server apparatus illustrated in FIG. 3 serving as a remote processor to remotely control traveling of the vehicle.

FIG. 5 is a flowchart of a travel control data generation control executed to remotely control the traveling of the vehicle 1 by the CPU 34 of the server apparatus 31 illustrated in FIG. 3 serving as the remote processor 38.

The CPU 34 of the server apparatus 31, serving as the remote processor 38, may repeatedly execute the travel control data generation control illustrated in FIG. 5 in step ST5 of FIG. 4.

In step ST11, the remote processor 38 may acquire data regarding a travel environment of the vehicle 1. In step ST4 of FIG. 4, the remote processor 38 may have mapped the position of the vehicle 1 and the data on the lighting state of the traffic light 4 to the high-precision map. The remote processor 38 may acquire, as data on the travel environment of the vehicle 1, the data on the high-precision map to which, for example, the position of the vehicle 1 is mapped. Further, the remote processor 38 may separately acquire the detection data of the vehicle 1.

In step ST12, the remote processor 38 may determine whether the position accuracy of the vehicle 1 is high. When the position of the vehicle 1 outputted by the sensor processor 16 is determined by the advanced GNSS receiver 27, the remote processor 38 may determine that the position accuracy of the vehicle 1 is high. The remote processor 38 may use the accuracy data of the position included in the detection data acquired from the vehicle 1 in step ST2 of FIG. 4 for making a determination. When the position accuracy of the vehicle 1 is high (step ST12: Y), the remote processor 38 may advance the process to step ST13. When the position accuracy of the vehicle 1 is not high (step ST12: N), the remote processor 38 may advance the process to step ST15. In step ST13, the remote processor 38 may set a narrow possible existence range corresponding to a high positional accuracy for a range in which the vehicle 1 can exist. The possible existence range may be, for example, set with respect to the position of the vehicle 1 being mapped to correspond to the position accuracy.

In step ST14, the remote processor 38 may generate normal travel control data under the narrow possible existence range generated in step ST13.

For example, the remote processor 38 may estimate a state after the vehicle 1 is moved in the narrow possible existence range at the vehicle speed of the vehicle 1 in the high-precision map in which the vehicle 1 has been mapped to its position. The remote processor 38 may determine whether there is interference under virtual traveling based on the estimation. When the inter-vehicle distance between the preceding vehicle and the vehicle 1 does not become less than or equal to a threshold corresponding to the vehicle speed, and when the course does not overlap with another moving body such as the oncoming vehicle 3, the remote processor 38 may generate the travel control data for causing the vehicle 1 to move as estimated. The remote processor 38 may generate travel control data regarding the preceding vehicle following control, the lane keep control, and the interference avoidance control. Alternatively, the remote processor 38 may generate, as the travel control data, data on the control values for the drive device 21, the braking device 22, and the steering device 23.

Thereafter, the remote processor 38 may end the control.

In step ST15, because the remote processor 38 has determined that the position accuracy of the vehicle 1 is not high, the remote processor 38 may set a wide possible existence range as the range in which the vehicle 1 can exist. The remote processor 38 may set a range that is wider than the possible existence range set in step ST13, in accordance with the accuracy data of the position included in the detection data acquired from the vehicle 1 in step ST2 of FIG. 4.

In step ST16, the remote processor 38 may determine whether there is the intersection 2 in the advancing direction of the vehicle 1 within a range of distance in which the vehicle 1 will move before the next control. The remote processor 38 may determine whether there is the intersection 2 in the advancing direction of the vehicle 1 in the high-precision map in which the vehicle 1 has been mapped to its position. Alternatively, the remote processor 38 may analyze a captured image from the vehicle 1 to determine whether there is the intersection 2 in the advancing direction of the vehicle 1. Alternatively, the remote processor 38 may make a determination based on both of the above. When there is the intersection 2 in the advancing direction of the vehicle 1 (step ST16: Y), the remote processor 38 may advance the process to step ST17. When there is no intersection 2 in the advancing direction of the vehicle 1 (step ST16: N), the remote processor 38 may advance the process to step ST19.

In step ST17, the remote processor 38 may determine whether the traffic light 4 at the intersection 2 in the advancing direction of the vehicle 1 is in a lighting state that does not allow the vehicle 1 to pass through the intersection 2. The remote processor 38 may acquire the data on the lighting state of the traffic light 4 at the intersection 2, based on the high-precision map in which the vehicle 1 has been mapped to its position or the captured image of the vehicle 1, and make a determination. When the traffic light 4 at the intersection 2 is lit in a state other than red and is in the lighting state that allows the vehicle 1 to pass (step ST17: N), the remote processor 38 may advance the process to step ST19. When the traffic light 4 at the intersection 2 is in the lighting state that does not allow the vehicle 1 to pass (step ST17: Y), the remote processor 38 may advance the process to step ST18. In this case, the remote processor 38 may basically generate travel control data that stops the vehicle 1 at the intersection 2 in accordance with the lighting state of the traffic light 4 at the intersection 2.

In step ST18, when the vehicle 1 is to be stopped at the intersection 2, the remote processor 38 may determine whether it is possible to execute a stop line process that increases the position accuracy of the vehicle 1 instead of simply stopping the vehicle 1 at the intersection 2.

For example, it is possible for the remote processor 38 to obtain the remaining distance from the vehicle 1 to the stop line 5 at the intersection 2 in the high-precision map in which the vehicle 1 has been mapped to its position. In this case, it is possible for the remote processor 38 to determine whether it is possible to stop the vehicle 1 within the remaining distance when the vehicle 1 is stopped by decelerating from the current vehicle speed. It is possible for the remote processor 38 to further determine whether the vehicle 1 is stoppable at a position where the image of the stop line 5 on the road is capturable by the vehicle-mounted camera of the vehicle 1 after the vehicle 1 is stopped.

If it is possible to stop the vehicle 1 at the position where the image of the stop line 5 on the road is capturable by the vehicle-mounted camera of the vehicle 1 after the vehicle 1 is stopped, the remote processor 38 may determine that the stop line process is executable (step $18: Y) and advance the process to step ST20.

In contrast, if it is not possible to stop the vehicle 1 at the position where the image of the stop line 5 on the road is capturable by the vehicle-mounted camera of the vehicle 1 after the vehicle 1 is stopped, the remote processor 38 may determine that the stop line process is not executable (step S18: N) and advance the process to step ST19.

Further, the remote processor 38 may also determine a deceleration rate used to stop the vehicle 1 at the position where the image of the stop line 5 on the road is capturable by the vehicle-mounted camera. In this case, the remote processor 38 may compare the deceleration rate used to stop the vehicle 1 within the remaining distance with a maximum deceleration rate of the vehicle 1 that is normally usable in the remote travel control of the vehicle 1. When the deceleration rate of the case where the vehicle 1 is stopped at the position where the image of the stop line 5 is capturable by the vehicle-mounted camera is less than or equal to the maximum deceleration rate, the remote processor 38 may determine that the stop line process is executable (step S18: Y) and advance the process to step ST20. Otherwise (step S18: N), the remote processor 38 may advance the process to step ST19. In this case, the occupant of the vehicle 1 is less likely to feel uncomfortable with regard to the remote control of the vehicle 1 when the stop line process is executed.

The maximum deceleration rate that is usable in the stop line process may be separately set to be smaller than the maximum deceleration rate of the vehicle 1 that is normally usable in the remote travel control of the vehicle 1. Reducing the deceleration rate that occurs in the stop line process helps to increase the accuracy of the position of the vehicle 1 after the vehicle 1 is stopped by reducing an error relative to a desired position.

As described above, it is possible for the remote processor 38 to determine whether it is possible to stop the vehicle 1 by the stop line process, based on the virtual travel environment generated by mapping to correspond to the reality.

In step ST19, the remote processor 38 may generate the travel control data by the normal travel control without depending on the stop line process. Note that the remote processor 38 may generate normal travel control data under the wide possible existence range generated in step ST15. Thereafter, the remote processor 38 may end the control.

In step ST20, the remote processor 38 may generate the travel control data for the stop line process. The remote processor 38 may generate the travel control data that stops the vehicle 1 at the position where the image of the stop line 5 on the road is capturable by the vehicle-mounted camera of the vehicle 1 after the vehicle 1 is stopped.

The deceleration rate in the stop line process may basically be the maximum deceleration rate of the vehicle 1 that is normally usable in the remote travel control of the vehicle 1. The deceleration rate in the stop line process may be smaller than the deceleration rate with which the accuracy of the position of the vehicle 1 outputted by the sensor processor 16 of the vehicle 1 may be kept high.

Thereafter, the remote processor 38 may end the control.

As described above, the remote processor 38 of the server apparatus 31 of the example embodiment executes the stop line process when a predetermined condition is satisfied while the travel control data for the normal travel control is being generated. This makes it possible for the remote processor 38 to execute the stop line process while the vehicle 1 is traveling. The driver of the vehicle 1 is not to cause the vehicle 1 to travel specially in order to execute the stop line process.

Figure 6:
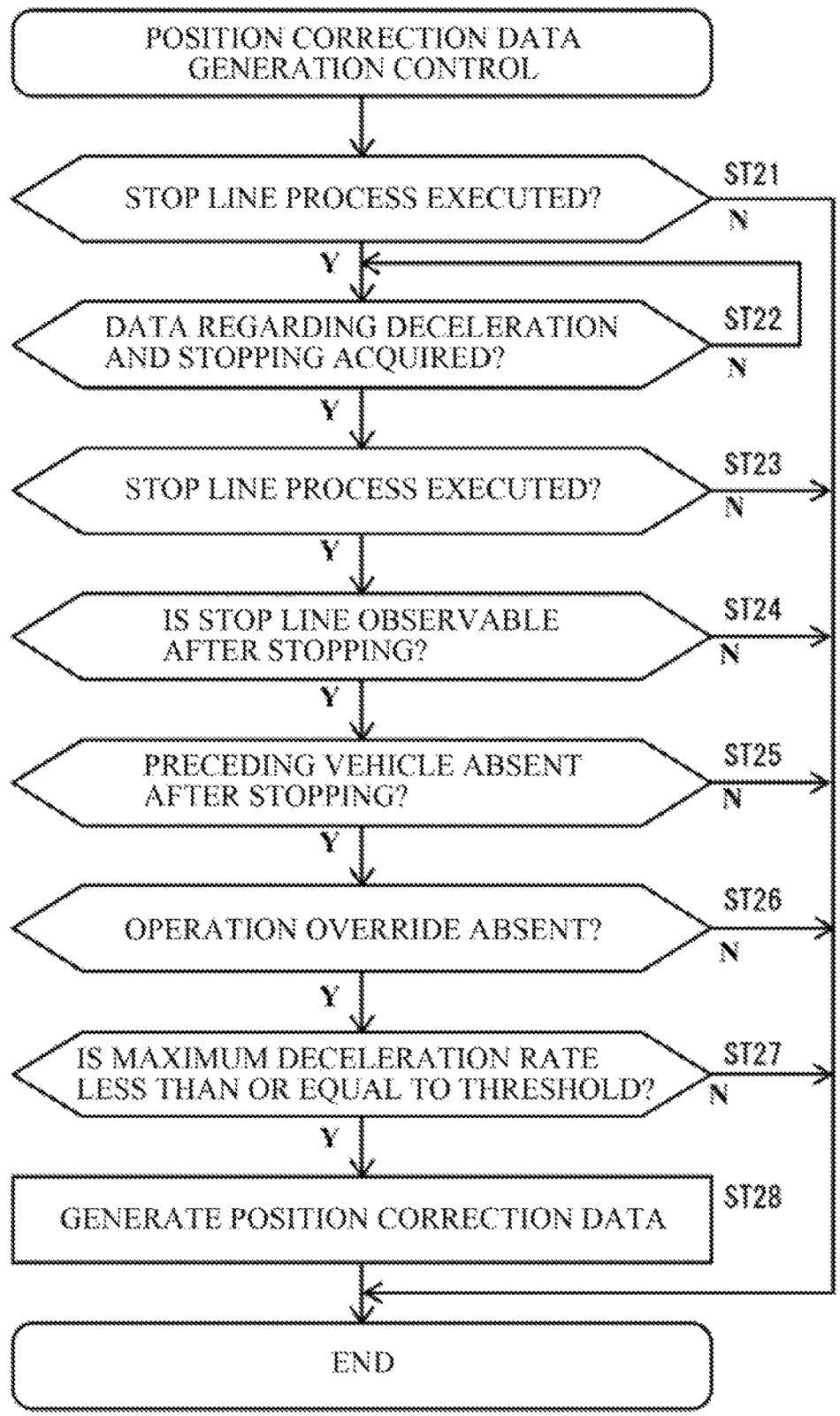
FIG. 6 is a flowchart of a vehicle position correction data generation control executed by the CPU of the server apparatus illustrated in FIG. 3 serving as the remote processor to remotely control traveling of the vehicle.

FIG. 6 is a flowchart of a position correction data generation control for the vehicle 1 executed to remotely control the traveling of the vehicle 1 by the CPU 34 of the server apparatus 31 illustrated in FIG. 3 serving as the remote processor 38.

The CPU 34 of the server apparatus 31, serving as the remote processor 38, may repeatedly execute the position correction data generation control for the vehicle 1 illustrated in FIG. 6, separately from the process of FIG. 4.

In step ST21, the remote processor 38 may determine whether the stop line process of step ST20 in FIG. 5 has been executed. When the stop line process has been executed (step ST21: Y), the remote processor 38 may advance the process to step ST22. When the stop line process has not been executed (step ST21: N), the remote processor 38 may end the control.

In step ST22, the remote processor 38 may determine whether data regarding deceleration and stopping performed by the stop line process has been received and acquired from the vehicle 1 that has executed the stop line process.

For example, the travel processor 12 of the vehicle 1 may collect the detection data of the own vehicle in, for example, step ST1 of FIG. 4, and transmit the detection data of the own vehicle to the server apparatus 31 in step ST2. When the vehicle 1 is stopped by executing the stop line process, the travel processor 12 may collect data regarding the deceleration and the stopping performed by the stop line process as part of the detection data, and transmit the data to the server apparatus 31. As a result, it is possible for the communicator 32 of the server apparatus 31 to receive the data regarding the deceleration and the stopping performed by the stop line process as part of the detection data.

Here, the data regarding the deceleration and the stopping of the vehicle 1 may include, for example, whether the stop line process is executed, post-stop position data of the vehicle 1, presence or absence of the preceding vehicle in front of the vehicle 1 after the vehicle 1 is stopped by the stop line process, presence or absence of an operation override during the stop line process, and data regarding the maximum deceleration rate in the stop line process.

When the data regarding the deceleration and the stopping performed by the stop line process has not been received from the vehicle 1 that has executed the stop line process (step ST22: N), the remote processor 38 may repeat the process. When the data regarding the deceleration and the stopping has been received (step ST22: Y), the remote processor 38 may advance the process to step ST23.

From step ST23, the remote processor 38 may start making an evaluation of the deceleration and the stopping of the vehicle 1 performed by the stop line process. First, the remote processor 38 may determine whether the stop line process has been executed. When the stop line process has not been executed appropriately (step ST23: N), the remote processor 38 may end the control. When the stop line process has been executed appropriately (step ST23: Y), the remote processor 38 may advance the process to step ST24.

In step ST24, the remote processor 38 may determine whether the stop line 5 is observable from the vehicle 1 that is stopped. The remote processor 38 may analyze the image captured by the outside camera 24 of the vehicle 1 that is stopped, and determine whether the captured image includes the stop line 5. For example, when the entire stop line 5 is extractable, the remote processor 38 may determine that the stop line 5 is observable (step ST24: Y), and advance the process to step ST25. When the entire stop line 5 is not extractable (step ST24: N), the remote processor 38 may end the control.

In step ST25, the remote processor 38 may determine whether there is a preceding vehicle in front of the vehicle 1 that is stopped. The remote processor 38 may analyze the image captured by the outside camera 24 of the vehicle 1 that is stopped, and determine whether the captured image includes a preceding vehicle that is stopped. For example, when the preceding vehicle is extractable, the remote processor 38 may determine that there is a preceding vehicle (step ST25: N) and end the control. When the preceding vehicle is not extracted (step ST25: Y), the remote processor 38 may advance the process to step ST26.

In step ST26, the remote processor 38 may determine whether there is an override during the stop line process. Even when the stop line process is being executed during the traveling of the vehicle 1, an override by an emergency operation performed by the driver or an override by the interference avoidance control may possibly occur. The remote processor 38 may determine presence or absence of these overrides during the stop line process. When there is an override during the stop line process (step ST26: N), the remote processor 38 may end the control assuming that it was not possible to stop the vehicle 1 by the stop line process desired by the server apparatus 31. When there is no override (step ST26: Y), the remote processor 38 may advance the process to step ST27.

In step ST27, the remote processor 38 may evaluate the stop line process itself executed by the vehicle 1, based on the deceleration rate during the stop line process. The remote processor 38 may compare the maximum deceleration rate of the vehicle 1 that occurred during the stop line process with a threshold. When the maximum deceleration rate is less than or equal to the threshold (step ST27: Y), the remote processor 38 may determine that it was possible to stop the vehicle 1 by the stop line process desired by the server apparatus 31, and advance the process to the step ST28. When the maximum deceleration rate is not less than or equal to the threshold (step ST27: N), the remote processor 38 may end the control.

Based on the evaluation made in steps ST23 to ST27, it is possible for the remote processor 38 to evaluate the deceleration and the stopping performed by the stop line process, based on the data regarding the deceleration and the stopping performed by the stop line process acquired from the vehicle 1. When the evaluations of all items are satisfactory, the remote processor 38 may advance the process to step ST28 and execute a correction data generation process. The remote processor 38 may execute the correction data generation process when it is evaluated that: the vehicle 1 has executed the stop line process; there is no preceding vehicle in front of the vehicle 1 after the vehicle 1 is stopped; there is no operation override during the stop line process; and the deceleration rate in the stop line process is not greater than the threshold. When the evaluation is not satisfactory for any one of the items, the remote processor 38 may end the control without executing the correction data generation process in step ST28.

In step ST28, the remote processor 38 may generate correction data used to correct the position of the vehicle 1, based on the distance from the position of the vehicle 1 after the vehicle 1 is stopped to the stop line 5.

Here, the remote processor 38 may acquire the distance from the position of the vehicle 1 after the vehicle 1 is stopped to the stop line 5, based on a captured position of the stop line 5 in the image captured by the vehicle-mounted camera of the vehicle 1 after the vehicle 1 is stopped. The stop line 5 may be captured in the image at a position corresponding to a position relative to the vehicle 1. It is possible for the remote processor 38 to acquire a relative distance and a direction of the stop line 5 with respect to the vehicle-mounted camera of the own vehicle, based on the captured position of the stop line 5 in the captured image.

Further, the remote processor 38 may store the generated position correction data in the memory 35.

Thereafter, the remote processor 38 may end the control.

As described above, in some embodiments, the communicator 32 may receive the data regarding the deceleration and the stopping of the vehicle 1 from the vehicle 1 that has stopped in accordance with the travel control data in the stop line process. Further, the remote processor 38 may evaluate the deceleration and the stopping performed by the stop line process, based on the data regarding the deceleration and the stopping of the vehicle 1 acquired from the vehicle 1, and execute the correction data generation process in step ST28 when a result of the evaluation is satisfactory.

This makes it possible for the remote processor 38 to execute the correction data generation process when there is a high possibility that highly accurate correction data for correcting the position of the vehicle 1 is obtainable.

Figure 7:
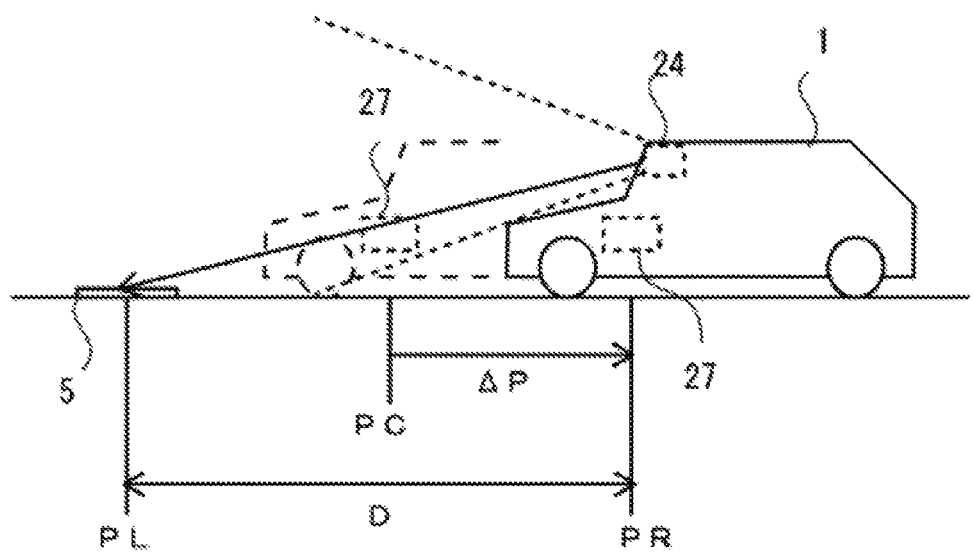
FIG. 7 is an explanatory diagram illustrating an example of a method of generating position correction data for the vehicle stopped by a stop line process.

FIG. 7 is an explanatory diagram illustrating an example of a method of generating the position correction data for the vehicle 1 stopped by the stop line process.

In FIG. 7, the actual vehicle 1 that is stopped at a position PR before the stop line 5 is illustrated by a solid line. The vehicle 1 may include the outside camera 24 and the GNSS receiver 27.

Also, a broken line in FIG. 7 illustrates a vehicle assumed to be at a position PC generated by the sensor processor 16, based on the GNSS receiver 27. The server apparatus 31 may receive the position indicated by the broken line as the position data of the vehicle 1.

In this case, the remote processor 38 may acquire, from the high-precision map data 37, data of a position PL of the stop line 5 captured by the vehicle-mounted camera.

The remote processor 38 may identify a relative positional relationship between the outside camera 24 and the stop line 5, based on the position of the stop line 5 in the image captured by the vehicle-mounted camera of the vehicle 1 after the vehicle 1 is stopped.

As a result, it is possible for the remote processor 38 to calculate a distance D from the stop line 5 to the position of, for example, the GNSS receiver 27 of the vehicle 1 that is stopped before the stop line 5 in such a manner that the image of the stop line 5 is capturable.

Further, it is possible for the remote processor 38 to calculate the position PR of, for example, the GNSS receiver 27 of the vehicle 1 that is stopped before the stop line 5 in such a manner that the image of the stop line 5 is capturable, based on the position PL of the stop line 5 in the high-precision map data 37.

Meanwhile, the remote processor 38 may acquire data of the position PC generated by the vehicle 1 from the vehicle 1.

It is possible for the remote processor 38 to generate, as the position correction data for the vehicle 1 stopped by the stop line process, a difference between the position PC of the position data from the vehicle 1 and the position PR obtainable based on the position PL of the stop line 5 in the high-precision map data 37.

For example, processing the data in the order described above makes is possible for the remote processor 38 to generate the correction data used to correct the position of the vehicle 1, based on the distance from the vehicle 1 to the stop line 5 based on the image captured by the vehicle-mounted camera of the vehicle 1 after the vehicle 1 is stopped, and the post-stop position data acquired from the vehicle 1 after the vehicle 1 is stopped.

Figure 8:
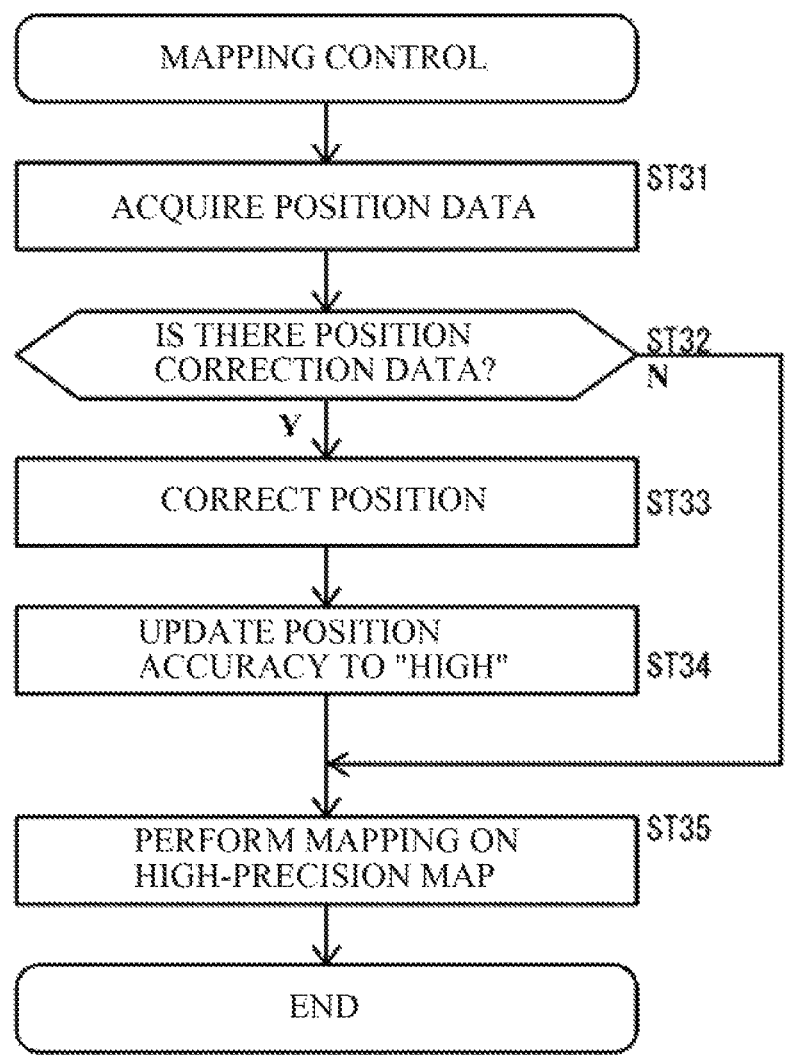
FIG. 8 is a flowchart of a mapping control executed by the CPU of the server apparatus illustrated in FIG. 3 serving as the remote processor to remotely control traveling of the vehicle in accordance with the position correction data.

FIG. 8 is a flowchart of a mapping control executed by the CPU 34 of the server apparatus 31 illustrated in FIG. 3 serving as the remote processor 38 to remotely control the traveling of the vehicle 1 in accordance with the position correction data.

The CPU 34 of the server apparatus 31, serving as the remote processor 38, may repeatedly execute the mapping control of FIG. 8 in step ST3 and step ST4 of FIG. 4.

In step ST31, the remote processor 38 may acquire the position data received from the vehicle 1 by the communicator 32 of the server apparatus 31.

In step ST32, the remote processor 38 may determine whether there is the position correction data for the vehicle 1 from which the position data has been acquired. When there is the position correction data (step ST32: Y), the remote processor 38 may advance the process to step ST33. When there is no position correction data (step ST32: N), the remote processor 38 may advance the process to step ST35.

In step ST33, the remote processor 38 may correct the position data of the vehicle 1 received by the communicator 32, based on the correction data.

In step ST34, the remote processor 38 may update the position accuracy of the position data of the vehicle 1 corrected based on the position correction data to "High".

In step ST35, the remote processor 38 may perform mapping of the vehicle 1 on the high-precision map based on the high-precision map data 37. Thus, when the position data of the vehicle 1 is corrected based on the position correction data, the vehicle 1 may be mapped to the corrected position.

Thereafter, the remote processor 38 may end the control and execute the travel control data generation control illustrated in FIG. 5 in step ST5 of FIG. 4. This makes it possible for the remote processor 38 to generate the travel control data for the vehicle 1, based on the corrected position. Additionally, the position accuracy of the corrected position data of the vehicle 1 may be updated to "High". Thus, even when the accuracy of the position data received from the vehicle 1 is low, it is possible for the remote processor 38 to generate the travel control data under the narrow possible existence range generated in step ST14, rather than the travel control data under the wide possible existence range generated in step ST19 of FIG. 5, based on the high accuracy of the corrected position.

For example, even when the accuracy of the position data transmitted from the vehicle 1 illustrated by the solid line in FIG. 1 is not high, it is possible for the remote processor 38 of the server apparatus 31 to generate the travel control data for the vehicle 1 without considering the possibility that the vehicle 1 exists at the position P1. Consequently, when the travel control data is generated to move the vehicle 1 illustrated by the solid line in FIG. 1 to the position P2 in FIG. 1, it is possible for the remote processor 38 of the server apparatus 31 to generate the travel control data for the vehicle 1 without considering the possibility that the vehicle 1 exists at the position P3 after the movement. Further, there may be no possibility that the vehicle 1 traveling based on the travel control data interferes with the oncoming vehicle 3 that is intending to turn right at the intersection 2.

As described above, in the example embodiment, the server apparatus 31 for the remote travel control of the vehicle 1 includes the communicator 32 and the remote processor 38. The communicator 32 communicates with the vehicle 1 that is adapted to capture the image of the course by the vehicle-mounted camera while traveling on the road, and receives the position data generated by the sensor processor 16 of the vehicle 1. The remote processor 38 generates the travel control data that is usable by the vehicle 1 for the travel control, based on the position data of the vehicle 1 received by the communicator 32, and transmits the generated travel control data from the communicator 32 to the vehicle 1.

The remote processor 38 of the server apparatus 31 executes the stop line process and the correction data generation process. The stop line process generates the travel control data that is adapted to stop the vehicle 1 at the position where the stop line 5 on the road is capturable by the vehicle-mounted camera of the vehicle 1 after the vehicle 1 is stopped. The correction data generation process generates, based on the captured position of the stop line 5 in the image captured by the vehicle-mounted camera of the vehicle 1 after the vehicle 1 is stopped, the correction data that is adapted to correct the position of the vehicle 1 based on the distance from the position of the vehicle 1 after the vehicle 1 is stopped to the stop line 5. The remote processor 38 corrects, after generating the correction data, the position data generated by the sensor processor 16 of the vehicle 1 and received by the communicator 32, based on the correction data. The remote processor 38 generates the travel control data for the vehicle 1, based on the corrected position data of the vehicle.

In some embodiments, the remote processor 38 may generate the correction data adapted to correct the position of the vehicle 1, based on the distance from the stop line 5 to a predetermined position of the vehicle 1, based on the image captured by the vehicle-mounted camera of the vehicle 1 after the vehicle 1 is stopped, the position data of the stop line 5 captured by the vehicle-mounted camera, and the post-stop position data of the vehicle 1 generated by the sensor processor 16 after the vehicle 1 is stopped.

This helps the server apparatus 31 to improve the position accuracy and generate the travel control data for the vehicle 1 even when the accuracy of the position data that is receivable from the vehicle 1 is not high.

It is possible for the server apparatus 31 to generate the travel control data to remotely control the traveling of the vehicle 1 by assuming that the position of the vehicle 1 traveling on the road is accurately grasped and, as a result, narrowing the possible existence range of each vehicle 1.

For example, when the vehicle 1 is traveling toward the intersection 2 where the oncoming vehicle 3 is turning right, it is possible for the server apparatus 31 to generate the travel control data for the vehicle 1 based on the estimation that there is a possibility of interference with the oncoming vehicle 3 during a period as short as possible assuming that the positional error of the vehicle 1 is small.

As described above, in the example embodiment, it is possible to improve the server apparatus 31 for the remote travel control of the vehicle 1. This helps the vehicle 1 to execute a smooth travel control that ensures safety under the remote travel control of the server apparatus 31.

Additionally, it is possible for the occupant of the vehicle 1 that is stopped to check the stop line 5 by himself/herself in a field of view equivalent to that of the outside camera 24. This helps to prevent the occupant of the vehicle 1 from feeling uncomfortable with regard to the stop line process.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In at least one embodiment of the disclosure, the server apparatus for the remote travel control of the vehicle includes the communicator and the remote processor. The communicator communicates with the vehicle that is adapted to capture the image of the course by the vehicle-mounted camera while traveling on the road, and receives the position data of the vehicle. The remote processor generates the travel control data that is usable by the vehicle for the travel control, based on the position data of the vehicle received by the communicator, and transmits the generated travel control data from the communicator to the vehicle.

The remote processor of the server apparatus executes the stop line process and the correction data generation process.

The stop line process generates the travel control data that is adapted to stop the vehicle at the position where the stop line on the road is capturable by the vehicle-mounted camera of the vehicle after the vehicle is stopped. The correction data generation process generates, based on the captured position of the stop line in the image captured by the vehicle-mounted camera of the vehicle after the vehicle is stopped, the correction data that is adapted to correct the position of the vehicle based on the distance from the position of the vehicle after the vehicle is stopped to the stop line. The remote processor corrects, after generating the correction data, the position data of the vehicle received by the communicator, based on the correction data. The remote processor generates the travel control data for the vehicle, based on the corrected position data of the vehicle.

This helps the server apparatus to improve the position accuracy and generate the travel control data for the vehicle even when the accuracy of the position data that is receivable from the vehicle is not high.

This makes it possible for the server apparatus to generate the travel control data to remotely control the traveling of the vehicle by assuming that the position of the vehicle traveling on the road is accurately grasped and, as a result, narrowing the possible existence range of each vehicle. It is possible to improve the server apparatus for the remote travel control of the vehicle according to at least one embodiment of the disclosure. This helps the vehicle to execute a smooth travel control that ensures safety under the remote travel control of the server apparatus.

The CPU 34 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the CPU 34. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the CPU 34 illustrated in FIG. 3.

The invention claimed is:

1. A server apparatus for a remote travel control of a vehicle, the vehicle having a vehicle-mounted camera configured to capture an image of a road on which the vehicle is traveling, the server apparatus comprising:
   a communicator configured to communicate with the vehicle, and receive, from the vehicle, position data of the vehicle; and
   a memory configured to store high-precision map data for the road, the high-precision map data including position data of a stop line at an intersection; and
   a remote processor configured to:
      control traveling of the vehicle by generating travel control data that is usable by the vehicle for a travel control, based on the position data of the vehicle received by the communicator; and
      transmit the generated travel control data from the communicator to the vehicle, wherein the remote processor is further configured to:
  execute a stop line process comprising generating the travel control data that causes the vehicle to stop at a position where the stop line on the road is capturable by the vehicle-mounted camera after the vehicle is stopped;
  receive, after the vehicle has stopped, an image including the stop line captured by the vehicle-mounted camera;
  determine an actual position of the vehicle based on a captured position of the stop line in the image and on the position data of the stop line included in high-precision map data;
  execute a correction data generation process comprising generating correction data representing a positional deviation between the received position data of the vehicle and the determined actual position of the vehicle;
  correct the position data of the vehicle received by the communicator based on the correction data; and
  generate new travel control data for the vehicle based on the corrected position data of the vehicle.

2. The server apparatus for the remote travel control of the vehicle according to claim 1, wherein
  the communicator is configured to receive post-stop position data of the vehicle from the vehicle that is stopped in accordance with the travel control data in the stop line process, and
  the remote processor is configured to generate the correction data adapted to correct the position of the vehicle, based on:
  the position data of the stop line captured by the vehicle-mounted camera, the position data being included in the high-precision map data;
  a distance from the vehicle to the stop line, based on the image captured by the vehicle-mounted camera of the vehicle after the vehicle is stopped; and
  the post-stop position data of the vehicle after the vehicle is stopped.

3. The server apparatus for the remote travel control of the vehicle according to claim 1, wherein
  the communicator is configured to receive post-stop position data of the vehicle and data regarding deceleration and stopping of the vehicle performed by the stop line process from the vehicle that is stopped in accordance with the travel control data in the stop line process, and
  the remote processor is configured to:
  make an evaluation of the deceleration and the stopping of the vehicle performed by the stop line process, based on the data regarding the deceleration and the stopping in the stop line process acquired from the vehicle; and
  control whether to execute the correction data generation process in accordance with a result of the evaluation of the deceleration and the stopping performed by the stop line process.

4. The server apparatus for the remote travel control of the vehicle according to claim 2, wherein
  the communicator is configured to receive the post-stop position data of the vehicle and data regarding deceleration and stopping of the vehicle performed by the stop line process from the vehicle that is stopped in accordance with the travel control data in the stop line process, and
  the remote processor is configured to:
  make an evaluation of the deceleration and the stopping of the vehicle performed by the stop line process, based on the data regarding the deceleration and the stopping in the stop line process acquired from the vehicle; and
  control whether to execute the correction data generation process in accordance with a result of the evaluation of the deceleration and the stopping performed by the stop line process.

5. The server apparatus for the remote travel control of the vehicle according to claim 3, wherein
  the communicator is configured to acquire, as the data regarding the deceleration and the stopping of the vehicle, data regarding whether the stop line process has been executed, presence or absence of a preceding vehicle in front of the vehicle after the vehicle is stopped by the stop line process, presence or absence of an operation override during the stop line process, and a deceleration rate in the stop line process, and
  the remote processor is configured to execute the correction data generation process upon making an evaluation that: the vehicle has executed the stop line process; no preceding vehicle is present in front of the vehicle after the vehicle is stopped, no operation override occurs during the stop line process, and the deceleration rate in the stop line process is not greater than a threshold.

6. The server apparatus for the remote travel control of the vehicle according to claim 4, wherein
  the communicator is configured to acquire, as the data regarding the deceleration and the stopping of the vehicle, data regarding whether the stop line process has been executed, presence or absence of a preceding vehicle in front of the vehicle after the vehicle is stopped by the stop line process, presence or absence of an operation override during the stop line process, and a deceleration rate in the stop line process, and
  the remote processor is configured to execute the correction data generation process upon making an evaluation that: the vehicle has executed the stop line process; no preceding vehicle is present in front of the vehicle after the vehicle is stopped, no operation override occurs during the stop line process, and the deceleration rate in the stop line process is not greater than a threshold.

7. The server apparatus for the remote travel control of the vehicle according to claim 5, wherein the remote processor is configured to
  determine whether the vehicle is stoppable at a position where the stop line on the road is capturable by the vehicle-mounted camera by the stop line process, when a traffic light on the road on which the vehicle is traveling is changed from a state allowing passage of the vehicle or when the vehicle is to be stopped at an intersection,
  generate travel control data that is adapted to execute the stop line process when the vehicle is stoppable by the stop line process, and
  generate travel control data not depending on the stop line process when the vehicle is not stoppable by the stop line process.

8. The server apparatus for the remote travel control of the vehicle according to claim 6, wherein the remote processor is configured to
  determine whether the vehicle is stoppable at a position where the stop line on the road is capturable by the vehicle-mounted camera by the stop line process, when a traffic light on the road on which the vehicle is traveling is changed from a state allowing passage of the vehicle or when the vehicle is to be stopped at an intersection, generate travel control data that is adapted to execute the stop line process when the vehicle is stoppable by the stop line process, and generate travel control data not depending on the stop line process when the vehicle is not stoppable by the stop line process.

9. The server apparatus for the remote travel control of the vehicle according to claim 1, wherein the remote processor is further configured to, via the communicator, cause the vehicle to perform at least one of acceleration, braking, or steering based on the new travel control data.

10. A server apparatus for a remote travel control of a vehicle, the server apparatus comprising:

a communicator configured to communicate with the vehicle that is adapted to capture an image of a course of the vehicle by a vehicle-mounted camera while the vehicle is traveling on a road, and receive position data of the vehicle; and a remote processor configured to generate travel control data that is usable by the vehicle for a travel control, based on the position data of the vehicle received by the communicator, and transmit the generated travel control data from the communicator to the vehicle, wherein the remote processor is configured to:

execute a stop line process comprising generating travel control data that is adapted to stop the vehicle at a position where a stop line on the road is capturable by the vehicle-mounted camera of the vehicle after the vehicle is stopped;

execute a correction data generation process comprising generating, based on a captured position of the stop line in the image captured by the vehicle-mounted camera of the vehicle after the vehicle is stopped, correction data that is adapted to correct a position of the vehicle based on a distance from the position of the vehicle after the vehicle is stopped to the stop line;

correct, after generating the correction data, the position data of the vehicle received by the communicator, based on the correction data; and generate the travel control data for the vehicle, based on the corrected position data of the vehicle, the communicator is configured to receive post-stop position data of the vehicle and data regarding deceleration and stopping of the vehicle performed by the stop line process from the vehicle that is stopped in accordance with the travel control data in the stop line process, and the remote processor is configured to:

make an evaluation of the deceleration and the stopping of the vehicle performed by the stop line process, based on the data regarding the deceleration and the stopping in the stop line process acquired from the vehicle;

control whether to execute the correction data generation process in accordance with a result of the evaluation of the deceleration and the stopping performed by the stop line process, the communicator is configured to acquire, as the data regarding the deceleration and the stopping of the vehicle, data regarding whether the stop line process has been executed, presence or absence of a preceding vehicle in front of the vehicle after the vehicle is stopped by the stop line process, presence or absence of an operation override during the stop line process, and a deceleration rate in the stop line process, and the remote processor is configured to execute the correction data generation process upon making an evaluation that: the vehicle has executed the stop line process; no preceding vehicle is present in front of the vehicle after the vehicle is stopped, no operation override occurs during the stop line process, and the deceleration rate in the stop line process is not greater than a threshold.

11. A server apparatus for a remote travel control of a vehicle, the server apparatus comprising:

a communicator configured to communicate with the vehicle that is adapted to capture an image of a course of the vehicle by a vehicle-mounted camera while the vehicle is traveling on a road, and receive position data of the vehicle; and a remote processor configured to generate travel control data that is usable by the vehicle for a travel control, based on the position data of the vehicle received by the communicator, and transmit the generated travel control data from the communicator to the vehicle, wherein the remote processor is configured to:

execute a stop line process comprising generating travel control data that is adapted to stop the vehicle at a position where a stop line on the road is capturable by the vehicle-mounted camera of the vehicle after the vehicle is stopped;

execute a correction data generation process comprising generating, based on a captured position of the stop line in the image captured by the vehicle-mounted camera of the vehicle after the vehicle is stopped, correction data that is adapted to correct a position of the vehicle based on a distance from the position of the vehicle after the vehicle is stopped to the stop line;

correct, after generating the correction data, the position data of the vehicle received by the communicator, based on the correction data; and generate the travel control data for the vehicle, based on the corrected position data of the vehicle, the communicator is configured to receive post-stop position data of the vehicle from the vehicle that is stopped in accordance with the travel control data in the stop line process, the remote processor is configured to generate the correction data adapted to correct the position of the vehicle, based on:

position data of the stop line captured by the vehicle-mounted camera;

a distance from the vehicle to the stop line, based on the image captured by the vehicle-mounted camera of the vehicle after the vehicle is stopped; and the post-stop position data of the vehicle after the vehicle is stopped, the communicator is configured to receive post-stop position data of the vehicle and data regarding deceleration and stopping of the vehicle performed by the stop line process from the vehicle that is stopped in accordance with the travel control data in the stop line process, the remote processor is configured to:

make an evaluation of the deceleration and the stopping of the vehicle performed by the stop line process, based on the data regarding the deceleration and the stopping in the stop line process acquired from the vehicle; and control whether to execute the correction data generation process in accordance with a result of the evaluation of the deceleration and the stopping performed by the stop line process, the communicator is configured to acquire, as the data regarding the deceleration and the stopping of the vehicle, data regarding whether the stop line process has been executed, presence or absence of a preceding vehicle in front of the vehicle after the vehicle is stopped by the stop line process, presence or absence of an operation override during the stop line process, and a deceleration rate in the stop line process, and the remote processor is configured to execute the correction data generation process upon making an evaluation that: the vehicle has executed the stop line process; no preceding vehicle is present in front of the vehicle after the vehicle is stopped, no operation override occurs during the stop line process, and the deceleration rate in the stop line process is not greater than a threshold.

* * * * *